(12) United States Patent
Järvenkylä

(10) Patent No.: US 6,176,269 B1
(45) Date of Patent: Jan. 23, 2001

(54) CO-EXTRUDER MULTILAYER PLASTIC PIPE, METHOD FOR PRODUCING THE SAME, AND DEVICE THEREFOR

(75) Inventor: Jyri Järvenkylä, Hollola (FI)

(73) Assignee: Uponor Innovation AB (SE)

( * ) Notice: Under 35 U.S.C. 154(b), the term of this patent shall be extended for 0 days.

(21) Appl. No.: 09/077,350

(22) PCT Filed: Dec. 12, 1996

(86) PCT No.: PCT/FI96/00659

§ 371 Date: Apr. 26, 1998

§ 102(e) Date: Apr. 26, 1998

(87) PCT Pub. No.: WO97/21950

PCT Pub. Date: Jun. 19, 1997

(30) Foreign Application Priority Data

Dec. 12, 1995 (FI) ....................................................... 955960

(51) Int. Cl.[7] ................................................ F16L 9/147
(52) U.S. Cl. .......................... 138/143; 138/149; 138/153
(58) Field of Search ................................. 138/112, 114, 138/143, 146, 148, 149, 153

(56) References Cited

U.S. PATENT DOCUMENTS

| | | | | |
|---|---|---|---|---|
| 3,557,840 | * | 1/1971 | Maybee | 138/149 |
| 3,561,493 | | 2/1971 | Maillard et al. | 138/141 |
| 4,025,675 | * | 5/1977 | Jonda | 138/148 |
| 4,081,302 | * | 3/1978 | Drostholm et al. | 138/149 |
| 4,239,064 | * | 12/1980 | Gilman | 138/149 |
| 4,271,218 | * | 6/1981 | Heckel et al. | 138/149 |
| 4,287,245 | * | 9/1981 | Kikuchi | 138/149 |
| 4,590,971 | * | 5/1986 | Webster et al. | 138/149 |
| 4,657,050 | * | 4/1987 | Patterson | 138/149 |
| 4,743,329 | * | 5/1988 | Hata | 138/143 |
| 4,972,759 | * | 11/1990 | Nelson | 138/149 |
| 5,313,987 | | 5/1994 | Rober et al. | 138/137 |
| 5,324,557 | * | 6/1994 | Lupke | 138/149 |
| 5,449,024 | | 9/1995 | Rober et al. | 138/137 |
| 5,934,337 | * | 8/1999 | Fiala et al. | 138/149 |
| 6,000,438 | * | 12/1999 | Ohrn | 138/149 |

FOREIGN PATENT DOCUMENTS

| | | |
|---|---|---|
| 1097220 | 1/1961 | (DE) . |
| 2821333 | 11/1978 | (DE) . |
| 0358178 | 3/1990 | (EP) . |
| 911293 | 3/1991 | (FI) . |
| 9002649 | 3/1990 | (WO) . |

* cited by examiner

Primary Examiner—James Hook
(74) Attorney, Agent, or Firm—Ladas and Parry

(57) ABSTRACT

The invention relates to a co-extruded multilayer plastic pipe comprising an inner pipe and an outer pipe and between them a middle layer of a softer material than the inner pipe. The invention also relates to a method of producing a co-extruded multilayer pipe in a multilayer extruder, and an apparatus for producing the co-extruded multilayer pipe.

28 Claims, 2 Drawing Sheets

CO-EXTRUDER MULTILAYER PLASTIC PIPE, METHOD FOR PRODUCING THE SAME, AND DEVICE THEREFOR

FIELD OF INVENTION

The invention relates to co-extruded multilayer plastic pipes comprising one or more inner pipes surrounded by a middle layer of a softer material, and an outer pipe enclosing said middle layer surrounding said one or more inner pipes. Preferably the multilayer plastic pipe of the invention comprises one inner pipe.

BACKGROUND OF INVENTION

Plastic pipes of the type described above, comprising one thin-walled inner pipe, are previously known. They are used, for example, as underground drain pipes, pressure pipes and cable ducts. They are more complicated to manufacture than conventional single-layer pipes, but since the consumption of material and thus also the weight of the pipe are lower than with single-layer pipes having corresponding properties, multilayer pipes are somewhat less expensive than conventional pipes. Nevertheless, their use is very limited particularly in northern latitudes. The main reason for this is that pipes of this kind have poor mechanical properties as compared with conventional single-layer pipes.

A conventional three-layer underground drain pipe has the following construction, which complies with the standards published in the field (the outside diameter of the pipe being 315 mm):

inner layer of hard PVC plastic, thickness about 1.4 mm, elasticity modulus about 2000 MPa, density about 1400 kg/M$^3$, middle layer of foamed PVC plastic, thickness about 9.4 mm, elasticity modulus about 800 MPa, foam density about 800 kg/m$^3$, outer layer of hard PVC plastic, thickness about 1.4 mm, elasticity modulus about 2000 MPa.

The ring stiffness of such a pipe is about 8.8 kN/m$^2$, which is sufficient for underground laying. The ring stiffnesses of the different pipe layers are as follows: the inner pipe (1) about 0.0167 kN/m$^2$, the middle layer (2) about 1.8 kN/m$^2$, and the outer pipe (3) alone about 0.0136 kN/m$^2$.

In the order of magnitude, the ring stiffnesses are 2, 1 and 3. This is the typical and predominant construction of foam pipes available on the market. Despite the foaming and thus the lowest elasticity modulus, the middle layer is the stiffest and the most load-bearing structure. The inner pipe is typically the second stiffest structure.

If the weights of the different layers of three-layer foam pipes available on the market are examined, another predominant dimensioning principle can be seen: the proportion of the weight of the solid layers to the total weight of the pipe is always less than 45%. In the example described above, the weight of the inner pipe was about 1.9 kg/m, of the middle layer about 7.4 kg/m, and of the outer pipe about 2 kg/m. The weight proportion of the inner pipe and the outer pipe taken together to the total weight of 11.2 kg was thus 34%.

U.S. Pat. No. 4,364,882 discloses a conventional PVC foam pipe. The PVC is foamed to a density of 500 kg/m$^3$, which in fact is the lowest value obtainable by conventional techniques. The typical foaming degree of PVC foam is 57%, whereby the density is 800 kg/m$^3$; if the density is lower than this, the strength properties of the PVC foam are weakened. The patent discloses a pipe having an outer diameter of 315 mm and the following structure: the thickness of the inner pipe 1.25 mm, the thickness of the middle layer 9 mm, and the thickness of the outer pipe 1.25 mm. The total thickness of the pipe is thus 11.5 mm, and the total weight is 7.63 kg/m; thus the pipe disclosed is 29% lighter in weight than a conventional pipe with a corresponding stiffness.

Further the following characteristics of the pipe above can be calculated: the weight of the inner pipe 1.61 kg/m and the ring stiffness 0.013 kN/m$^2$; the weight of the middle layer 4.32 kg/m and the ring stiffness 1.41 kN/m$^2$; the weight of the outer pipe 1.72 kg/m and the ring stiffness 0.011 kN/m$^2$. It can be seen that, as compared with the outer and inner pipes, the ring stiffness of the foamed middle layer is more than hundredfold, and that the weight proportion of the outer and inner pipes taken together is 44%.

The example described above shows that the use of foamed plastic has the advantage that it saves considerable amounts of material (i.e. cost saving) and the pipe construction becomes lighter. Such a use of material of "poorer quality" in the middle layer is appropriate in this connection, since this layer is the least subjected to mechanical stresses, such as wear and stress strains, and to physical and chemical stresses, such as UV radiation and various impurities.

On the other hand, when the foaming degree of the middle layer is increased, or its density is reduced, the properties of the foamed material are significantly weakened. So far the highest foaming degree used has in practice reduced the density of the material to half of the density of unfoamed material. If a higher foaming degree were used, the strength of the foam would be considerably weakened, and it has been considered impossible to construct a pipe of good quality using such foam. Although in the prior art solutions the foaming, for instance, has been maintained within such a range that the foamed material still has relatively good mechanical strength properties, it has not always been possible to avoid damages extending as far as the inner pipe. Nor has the use of a foamed intermediate layer resulted in quite as significant cost savings as originally intended.

SUMMARY OF INVENTION

The object of the present invention is to provide a co-extruded multi-layer plastic pipe where the inner pipe is protected more efficiently than in prior art solutions and at the same time to reduce the manufacturing costs of the pipe.

A further object of the present invention is to provide a co-extruded multilayer plastic pipe which has better mechanical properties, e,g. impact strength and ring stiffness, than those of the corresponding known pipes and which is lighter in weight in comparison with single-layer pipes and the corresponding known multilayer pipes.

Still another object of the invention is a method for producing a co-extruded multilayer plastic pipe comprising one or more inner pipes surrounded by a middle layer which is made of a softer material, and has a lower density than the outer and inner pipe, and an outer pipe enclosing said middle layer surrounding said one or more inner pipes.

A further object of the present invention is to provide a method for producing a co-extruded multilayer plastic pipe, said method enabling the production of pipes in which the middle layer of foamed plastic has a very low density and in said method foaming being carried out as in situ foaming using compressed gas.

A further object object of the present invention is to provide an apparatus for producing co-extruded multilayer pipes according to the invention.

The multilayer pipe according to the present invention has the essential feature that the most important portion, i.e. the inner pipe, is not broken or deformed under stresses of various kinds.

The above described properties can be achieved now with a multilayer plastic pipe of the present invention where the weight proportion of the polymer in the middle layer to the total weight of the plastic pipe is up to 55%.

According to the invention the most important portion of the construction, i.e. the inner pipe, can be protected by softer outer layers, i.e. layers which are more easily deformed, whereby the adhesive forces between the interfaces of all the layers are as small as possible and adjustable. The inner pipe thus remains circular and undamaged even if the outer pipe becomes oval as a result of compression or even breaks as a result of impact stress caused by a sharp-edged object, e.g. a stone, when the pipe is laid in an underground excavation.

The above-mentioned adhesive forces have unexpectedly been found to have an extremely great influence on the durability of a structure, particularly in the case of impact stresses. In the prior art three-layer pipes of the type described, the foamed intermediate layers have obviously—despite the foamed structure—been too hard and too tightly attached to the outer and inner pipes, wherefore a crack formed in the outer pipe by the action of impact has, in the worst case, extended to the intermediate layer and further to the inner pipe.

The pipe of the invention obviates the problems described above, since it is ensured that the force needed for cracking is greater than the adhesive force. The adhesive force or energy can be measured by standard peel test and the force for cracking can be analyzed by standard tensile strength measurement. The outer pipe can therefore undergo significant deformation without the inner pipe being deformed at all, as the intermediate layer of soft foam serves as a shock absorber between the inner and the outer pipe and keeps the inner and the outer pipes apart. The most typical damages to which plastic pipes are subjected are cracking, deformation or even breaking of a finished pipeline caused by an excavator or some other construction work.

The above-described known multilayer pipes with a foamed middle layer have a great number of disadvantages, the most significant being their low impact strength. The present inventors have discovered that this disadvantage is the result of the disadvantageous weight proportions of the different layers. As appears from the above analysis of the prior art pipes, the wall thickness, weight proportion and ring stiffness of the outer and inner pipe in prior art solutions are very small as compared with the foamed middle layer. For example, the weight proportion of the outer and inner pipe to the total weight of the pipe is up to 44%. When an impact hits the outer pipe, the impact energy is directed almost completely to the load-bearing middle surface, which is typically of a relatively unyielding high-density PVC foam. Since PVC plastic is extremely notch-sensitive, and since each air bubble in the foam forms a stress centre, the impact strength of the pipe is low, particularly in a cold climate.

The great impact strength of the pipe of the invention is thus surprisingly achieved by means of the feature that the weight proportion of the middle layer to the entire plastic pipe is smaller than in the prior art pipes. On account of this, the energy of an impact from outside the pipe is absorbed to a greater extent by the outer pipe and the middle layer than in the known pipes, wherefore the inner pipe remains undamaged more often than before. The middle layer is, in fact, softer than in the known pipes. The elasticity modulus of the middle layer is preferably no more than 25% of that of the inner pipe, most preferably less than 10%.

The weight proportions of the invention can also be expressed in such a manner that the proportion of the inner and outer pipe taken together to the total weight of the pipe is at least 45%, preferably 60% to 85% of the total weight.

According to a particularly preferred embodiment of the invention, the above-mentioned weight proportions and the desired proportions of ring stiffnesses are obtained by reducing the density of the foamed plastic in the middle layer as compared with the known pipes so that the density is no more than 500 kg/m$^3$, preferably 50 to 500 kg/m3, more preferably 100 to 300 kg/m$^3$. These values are achieved, for example, by increasing the foaming degree of the foamed plastic in the middle layer as compared with the known pipes so that it is at least 50%, preferably 70 to 95%, more preferably 70% to 85%, i.e. the density of the middle layer is up to 50%, preferably only 10% to 30%, of the density of a corresponding unfoamed material. It has been surprisingly discovered that despite the seemingly modest mechanical properties of such a middle layer, the mechanical properties of the entire pipe are much better than those of conventional multilayer pipes with a dense foamed middle layer. In addition, such a pipe is far lighter in weight than the corresponding known pipes, because the density of the foamed plastic is much lower.

The good mechanical properties of the pipe of the invention can possibly be explained by the fact that the middle layer and the outer pipe form a kind of pillow, which absorbs impact energy from outside before it reaches the inner pipe.

Especially good mechanical properties are obtained with an embodiment of the invention in which the outer pipe and the inner pipe are reinforced with orientation and/or oriented fibres and/or with cross-linking as set forth in our co-pending application PCT/EP96/02801, the disclosure of which is incorporated herein by reference for all purposes. Staple fibres, for example glass fibres having a fibre length of 0.5–10 mm, are conventionally not used for reinforcing extruded pipes mainly because, as a result of extrusion, fibres lie parallel to the axis of the pipe, and thus the reinforcing property of the fibres does not come into its own. This applies both to pressure pipes and drain pipes, where reinforcement is needed in the circumferential direction. Certain techniques, e.g. rotating mandrels and rotating nozzles, make the fibres lie partially in the circumferential direction as a result of the shearing effected by the rotating movement in the surface layers of the pipe. On account of its expenses, this kind of fibre structure is completely unknown in thermoplastic pipes to be used as drain pipes. Fibre-containing masterbatch is typically about 3 to 4 times more expensive than conventional polyethylene. Addition of fibres thus raises the price of the pipe, since the improved strength properties do not suffice to compensate for the higher price of the raw material.

According to the present invention, it has been unexpectedly discovered that final products cheaper than conventional pipes are, however, arrived at by the addition of fibres. This is because the reinforcing effect of the fibres is great in the layer which in the pipe of the invention is mainly load-bearing, i.e. the inner and the outer pipe. The economical usage of fibre reinforcement is based on the idea that the reinforcement is added only to sections where the stiffening effect is greatest, i.e. the skins; the volume needed is therefore relatively small compared to solid wall pipes. Secondly, the addition of the costly reinforcement to the middle section of the pipe would be useless to a great extent, because the middle section of the pipe will not strain much due to the pipe deflection, if the pipe is in underground sewer or drain use. One rational production method for the pipes according to this invention is described in our co-pending application FI 961822, the disclosure of which is incorporated herein by reference for all purposes.

Conventional PVC foam pipes that are not particularly carefully manufactured have also another disadvantage relating to notch sensitivity. Scratches are always formed on the outer surface of pipes during handling. Careless handling may result in scratches of even up to 0.5 mm on a PVC surface. If such a scratch happens to be formed in the three or nine o'clock direction when the pipe is deformed in the vertical direction, a strong stress centre is formed at the end of the notch. If the PVC is imperfectly machined, this may cause slow crack propagation, which is very well known in PVC pressure pipes. This phenomenon is also extremely significant in drain or sewer pipes to be laid in the ground. The problem is particularly serious in conventional foam pipes, in which the outer pipe is very thin. In the tests conducted, it has been found that a conventional thin-wall dense-foam PVC pipe breaks even in less than 100 hours under severe test conditions, whereas a PVC pipe of solid material or the pipe of the invention will last for thousands of hours. The pipes of the invention can have a thicker outer pipe due to the material saving middle layer, which helps to obviate the above-mentioned risk. Cracks will not extend so often to the foam layer, since there is a sufficient amount of load-bearing material even below the cracks.

According to the invention, the phenomenon can be prevented particularly efficiently by manufacturing the outer pipe of two different layers in such a manner that the adhesive energy between the layers is lower than the breaking energy. Crack propagation will therefore stop at the seam between these layers, and thus the crack is prevented from extending to the second layer. For example, if the multilayer pipe consists of an oriented polypropene (PP) inner pipe, a light-weight PP or PE foam middle layer, and an outer pipe consisting of two layers, i.e. a thin solid layer of MDPE adjacent to the middle layer and a solid outer layer of PP, a possible crack initiated in the outer layer of PP will hardly extend to the MDPE layer. The adhesion between MDPE and PP can be kept low enough for example by controlling extrusion parameters. According to another embodiment of the invention, this phenomen can be utilized when materials, densities and extrusion parameters are chosen for the middle layer foam and outer pipe.

During the use of underground drain pipes, the inner pipe is subjected to several kinds of stresses. It has been estimated that, in addition to chemical stress, the particles carried with the sewage may wear the pipe wall even 0.5 mm during a hundred years of use. An even greater stress is caused by pipe cleaning operations. Studies have shown that mechanical cleaning may cause scratches in the pipe surface that are even 0.7 mm deep. On the other hand, water jetting cleaning, which is gentler than mechanical cleaning when used in the conventional manner, may make a cut through the pipe wall if too high a pressure is used. According to an embodiment of the invention, the inner pipe is made of rubber-like thermoplastic or elastomer, whereby extremely good properties are achieved against cutting. The reason behind this has not yet been fully explained, but in the pipe of the invention the rather thick inner pipe, on the other side of which there is a very soft foam layer, obviously forms a poorly resonating surface, which is far more resistant to the cutting effect of a water jetting than a conventional foam pipe.

A problem with lighter pipes is that, when the aim is to save a significant amount of material by keeping the ring stiffness constant, the material and strength are reduced from the load-bearing layers of great strength. This problem is most obvious in two-wall corrugated pipes made of polyethylene. When the inner wall is thin, the axial stiffness of the pipe is low and the pipe is rather limp; it may even be difficult to lay the pipe in a straight position. In this respect, the pipe of the invention, which can be considered equal to the previously superior ribbed pipes as regards the manufacturing costs, is extremely good. The axial stiffness increases significantly with the profile height; therefore in this embodiment, the three-layer pipe is a very stiff construction, as the profile can be economically made higher than before.

Insufficient axial stiffness may also become apparent after the installation during use. Hardly any plastic pipe can be of such a stiff structure that it will remain straight even when the underlying surface is uneven. However, when the load above the pipe is local, there is a clear difference in the behaviour of different kinds of pipes. In an axially flexible pipe, local load causes a deformation which is immediately visible as a dent. An embodiment of the pipe according to the invention has the excellent surprising property that local load causes a deformation which dents usually only the outer surface and middle layer of the pipe, whereas the stiffer inner pipe is not as easily deformed. As a result of this, for instance, pipe gauges drawn through a pipe for examining deformation are not unnecessarily stuck because of a local deformation; in any case, the intention is to examine the average deformation. The above applies naturally also to other equipment, such as cleaning tools, etc.

The phenomenon described above is extremely significant to the laying technique. Conventional pipes must be laid on a selected sand bed from which any bigger stones have been removed, whereas the pipe of the invention can be laid without any protective materials on account of the sacrificial outer layer. It is common knowledge that more than 80% of the costs of a pipe trench are incurred by excavation and protective materials; it is therefore evident that the pipe of the invention, in which the outer pipe and the middle layer have a ring stiffness substantially lower than that of the inner pipe, can reduce the total costs of a pipeline to a great degree. One way to ensure that the outer layers will deflect more than the inner pipe is to carefully choose not only the construction principle of the pipe but also the materials for the middle layer and outer layer. In other words, in addition to selecting correct ring stiffnesses, certain local buckling or compressability could also be allowed. Local compression can be allowed for instance by using softer materials in the outer layers. The compressive modulus of the inner layer is preferably at least twice that of the outer layer and middle layer measured together. In one embodiment of the invention in which the stiffness of the inner pipe is greater than that of the other layers, the outer pipe is deformed under load so that it becomes more elliptical than the inner pipe owing to the structure according to the invention. This is a particularly significant feature, for example, in cable ducts.

When laid in the ground, a typical plastic pipe is always deformed by about 1% to 1.5%, by 3% at the most. The deformation is mainly caused by consolidation of the ground after the pipe has been laid. The ideal thickness of the flexible protective layer is therefore 9 mm for a pipe of 300 mm. The protective layer should absorb such a deformation without the inner pipe being deformed; in other words, the wall should be compressed by 4.5 mm. To enable this compression, there must be sufficient space in the wall. By 50% foaming of a foam pipe, for example, the minimum thickness of the foam should be 9 mm to prevent the entire load from shifting to the inner pipe. If a foaming degree of 80% is used, the same load level on the outer surface of the inner pipe is achieved with a foam layer of about 5.6 mm, which is an essentially cheaper solution. However, if the thickness of the foam layer is 9 mm but the foaming degree is 80%, i.e. the foam is light, the impact receiving flexibility is substantially longer, which contributes to the great impact strength.

A method according to the invention comprises producing a co-extruded multilayer pipe with one or more inner pipes in an extruder with at least one screw for the outer and one screw for the middle layer for conveying and plasticizing the plastic material prior to forming it as a pipe.

Methods of this kind are disclosed, for example, in CA 1205265 and EP 0236645. In these known methods, the foaming of the plastic material forming the middle layer is effected by adding a chemical foaming agent to the plastic material. A drawback of such a chemical foaming method is that it is impossible to obtain very low densities with it, i.e. the foaming degree obtained is usually below 50%.

The present invention provides a method for producing a multilayer plastic pipe, said method enabling the production of pipes in which the middle layer of foamed plastic has a very low density. This can be carried out by injecting pressurized gas to the plastic material in the plasticization zone of the screw for the middle layer at a point where the plastic material has already substantially melted, and the gas is mixed with the plastic matrix, which is compressed and extruded into a gap between the inner and the outer layer of the pipe.

The gas is most advantageously injected through the wall of the cylinder surrounding the screw towards the screw, whereas it is mixed with the plastic material in a zone located at the end of the screw. According to a preferred embodiment of the method of the invention, up to 1% of a chemical foaming agent is added to the plastic material. The foaming agent thus acts as a nucleating agent for the gas cells, which enhances physical foaming.

In the following, the invention will be described in greater detail with reference to the accompanying drawings, in which

DETAILED DESCRIPTION

Figure 1:
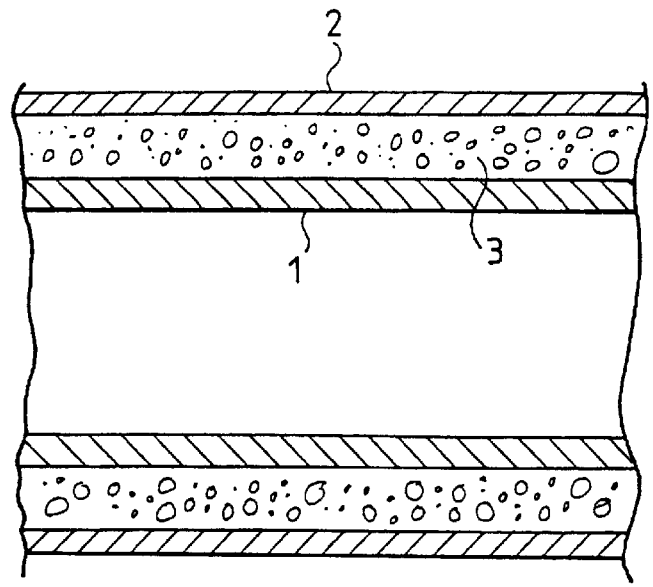
FIG. 1 is a longitudinal sectional view of a multilayer plastic pipe of the invention comprising one inner pipe.

The pipe shown in FIG. 1 comprises an inner pipe 1, an outer pipe 2, and a middle layer 3 of foamed plastic.

The inner pipe 1 is made e.g. of medium density polyethylene (MDPE) of pressure pipe quality, or some other thermoplastic or thermosetting plastic. MDPE pipes have a density typically of 940 kg/m$^3$ and a wall thickness of 1 to 5 mm, preferably 2 to 3 mm, in the case of pressureless pipes having an internal diameter of 300 mm. In shielded pressure pipes the materials are typically PVC, oriented PE, cross-linked PE (PEX) or PP. The wall thicknesses can be thicker in shielded pressure pipes, depending on the allowed stress in the pipe material. The essential point is that the allowed stress in these kinds of shielded pressure pipes can be higher than in normal solid wall pipes. This is possible because the inner pipe is not as much subjected to external stresses due to the softer middle foam layer and the outer layer of the present invention; these layers also reinforce the structure.

The outer pipe 2 may be made of high density polyethylene (HDPE), e.g. for blow moulding use, with a density of about 955 kg/m$^3$ and a wall thickness substantially the same as that of the inner pipe. Alternative outer pipe materials are PVC, PP, MDPE and especially PEX because of its high slow crack growth resistance.

The middle layer 3 is made of foamed plastic, e.g. polyethylene (LDPE), having a density lower than that of the inner and outer pipes and a wall thickness typically of 5 to 20 mm, preferably about 10 mm. If better insulation properties are desired or better protection for the inner pipe against outer disturbances is needed, thicker foam layers are used. The maximum foam thickness achieved by this manufacturing method is close to 50 mm. The upper limits can be extended by the use of cross-linked foam materials.

According to the invention, the weight proportion of the middle layer 3 to the entire plastic pipe is up to 55%. This proportion is based on the mass of polymer in the middle layer, and thus fillers, for instance, have not been taken into account. The advantages of the invention are particularly apparent if the weight proportion of the middle layer is only 15% to 40%.

The mechanical properties of the foamed middle layer can be easily adjusted by fine fillers and/or fibre-like additives such as minerals or man-made short fibres. Fibres seem to reinforce the foamed middle layer very effectively. For example the compressive strength can be easily adjusted by adding for example 5 to 30% Wollastonite to a polyolefin foam.

In the pipe of the invention, the decrease in the weight proportion of the middle layer 3, which improves the impact strength of the pipe, is achieved particularly by reducing the density of the middle layer of foamed plastic as compared with the known pipes. It is thus advisable that the density of the middle layer is 500 kg/m$^3$ at the most, preferably only 100 to 300 kg/m$^3$. In the tests conducted, it has been found that a pipe whose outer and inner pipe are of polyethylene and whose middle layer is of a polyethylene foam has an extremely great impact strength when the density of the middle layer is about 200 kg/m$^3$, which corresponds to a foaming degree of about 79%. Generally speaking, it is advisable that the foaming degree of the middle layer is at least 50%, preferably 70 to 85%. The suitable elasticity modulus of the resin for the middle layer without additives or fillers is 100–500 MPa, preferably about 300 MPa, if measured e.g. by the ISO 178 method. When the resin for the middle layer is foamed, the elasticity modulus naturally decreases to a great extent. Well-functioning pipes according to the present invention can have a foam modulus as low as 25 MPa. If required, the foam modulus can be increased by the use of fillers. In view of the impact strength of the pipe, the density of the foam is preferably within the above limits on the average: it becomes lower towards the middle of the layer.

The resistance of the inner pipe 1 against cutting can be improved in one embodiment of the invention by making the inner pipe of a rubber-like thermoplastic or elastomer with an elasticity modulus of up to 500 MPa.

When the pipe of the invention is intended for use as an underground drain pipe, the ratio of the outer diameter of the pipe to the thickness of the outer pipe is preferably 210 at the most, and the ratio of the inner diameter of the pipe to the thickness of the inner pipe is 200 at the most.

Especially the inner pipe 1, but possibly also the outer pipe 2, is reinforced with fillers or fibrous reinforcements and/or the raw material of the pipe is oriented or cross-linked. The pipe has a very great impact strength if the inner and/or the outer pipe are of oriented thermoplastic in which e.g. glass staple fibres oriented so as to deviate from the axial direction of the pipe are used as reinforcement.

The inner pipe 1 is preferably of an unpigmented or light coloured plastic, whereby it is easy to search for and check damages by means of a video survey. The outer pipe 2 is preferably UV stabilized, normally pigmented black, whereby the pipe endures outside storing; carbon black also increases the impact strength of the outer pipe.

The outer pipe 2 alone or together with the middle layer 3 can be corrugated or ribbed.

The inner and outer pipes and the middle layer have all their own ring stiffnesses, depending on e.g. the wall thickness of the layer, i.e. the mass proportion, and the elasticity modulus.

In shielded pressure pipes the ring stiffness of the inner pipe is preferably at least equal to, preferably two- to tenfold compared with the ring stiffness of the foam layer. Also, in the case of shielded sewer or drain pipes, the ring stiffness of the inner pipe is typically higher than that of the foam layer. In stead in economical underground sewer or drain applications, the ring stiffness of the inner pipe is lower, typically one to ten percent of the ring stiffness of the foam layer. In this case, the foam layer is the stiffest part of the pipe structure, and the stiffness of the outer layer is typically the lowest of all. Generally in sewer applications the ring stiffnesses of the individual layers are within the range of 0.0050 to 0.3000 kN/m2, and the stiffest layer is preferably the middle layer or the inner pipe.

In some applications the outside layer can be designed to be the stiffest layer, whereby special properties are achieved. An example of such a case is a pipe having a flexible PEX inner pipe, a foam layer and an outside layer made of Mica-filled polyolefin. This construction offers insulation properties as well as axial rigidity. On account of the rigidity the pipes remain straight in above ground installations, whereas normal plastic pipes having a relatively thin wall easily sag between the installation clamps. This combination has an additional benefit because of the good barrier properties of Mica filled-polyolefin.

Still another very useful application of the multilayer pipe according to the invention is a pressure pipe comprising a PEX inner pipe, a thin foam layer and a metal culvert with a plastic skin. In this case the foam provides adhesion between PEX and the metal, such as aluminium. It allows the outer diameter of the inner pipe to shrink or expand while the outside diameter of the composite remains constant.

The co-extruded multilayer pipes according to the present invention have a total ring stiffness of preferably over 8 kN/m2, which is usually requested in many applications: in pressure pipes due to the risk of surge, and in pressureless applications due to the soil load. The problem of flexible pipes being too flexible becomes evident when oriented, or other high-performance thermoplastic pipes are used. When the allowed stress in the media pipe is high, above 12,5 $N/m^2$, the ring stiffness of a 10 bar pipe can be too low for underground installation or for pipelines where vacuum surge is possible. According to the invention the total stiffness of a multilayer pressure pipe can be easily adjusted to a proper level. The total ring stiffness can be easily increased to a sufficient level by co-extruding a protective foam layer and a skin in the pipe. For example, if the ring stiffness of an oriented PVC pipe were 4 $kN/m^2$, the addition of a thin foam layer could increase the ring stiffness to 8 $kN/m^2$, which in most cases is the minimum for underground installations, or even beyond 16 $kN/m^2$, which is often needed in poor soil types. This kind of high stiffness can be beneficial even in "no sand" installations.

The following table shows examples of pipe structures of the invention. All examples relate to a pipe having an internal diameter of 300 mm and a ring stiffness of 8,8 kN/m2. The foam layers of the examples do not contain any fillers.

| | ρ kg/m³ | E Mpa | Layer thickness mm | Weight kg/m | Stiffness kN/m | Stiffness order | Mass prop. % of outer and inner pipe |
|---|---|---|---|---|---|---|---|
| PE pipe 1 | | | | | | | |
| inner pipe NCPE 2467 | 955 | 800 | 4.30 | 3.93 | 0.1881 | 1 | |
| foam layer Mobil HTA001 F | 200 | 25 | 11.16 | 2.23 | 0.0900 | 2 | |
| outer pipe | 949 | 920 | 1.54 | 1.53 | 0.0076 | 3 | |
| Mobil HTA001 | | | | 7.69 | | | 71.00% |
| PE pipe 2 | | | | | | | |
| innerpipe NCPE 2467 | 955 | 800 | 2.00 | 1.81 | 0.0194 | 2 | |
| foam layer Mobil HTA001 F | 200 | 25 | 13.60 | 2.70 | 0.1662 | 1 | |
| outer pipe | 949 | 920 | 2.00 | 1.99 | 0.0166 | 3 | |
| Mobil HTA001 | | | | 6.50 | | | 58.46% |
| PE pipe 3 | | | | | | | |
| inner pipe NCPE 2467 | 955 | 800 | 1.54 | 1.39 | 0.0089 | 3 | |
| foam layer | 200 | 25 | 12.56 | 2.48 | 0.1334 | 2 | |

-continued

|  | ρ kg/m³ | E Mpa | Layer thickness mm | Weight kg/m | Stiffness kN/m | Stiffness order | Mass prop. % of outer and inner pipe |
|---|---|---|---|---|---|---|---|
| Mobil HTA001 F outer pipe | 949 | 920 | 4.30 | 4.26 | 0.1658 | 1 | |
| Mobil HTA001 | | | | 8.13 | | | 69.50% |

Figure 4:
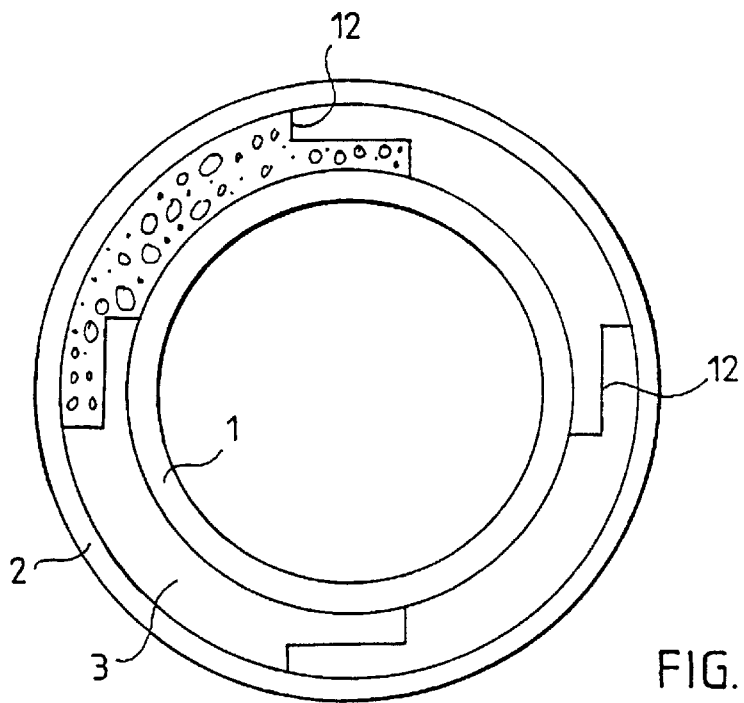
FIGS. 4 and 5 illustrate two other embodiments of the multilayer pipe of the invention.
Figure 5:
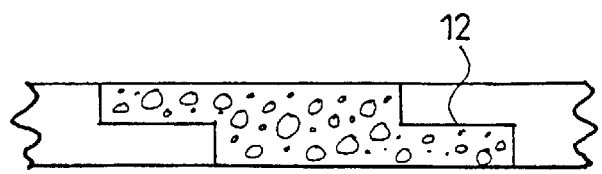
Figure 2:
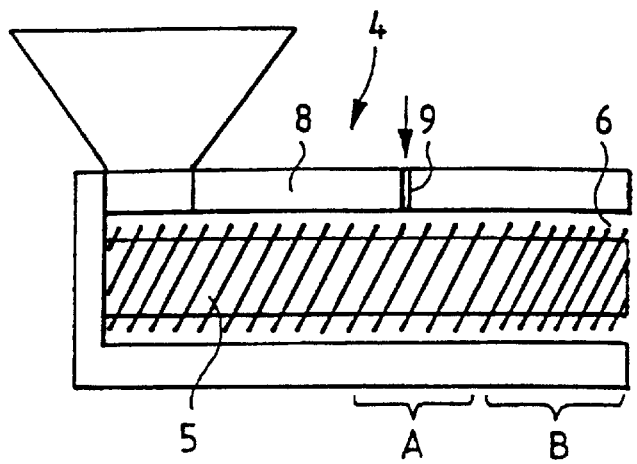
FIGS. 2 and 3 illustrate an apparatus for producing the multilayer plastic pipe of the invention.

As an alternative to the embodiments described above, the foamed plastic forming the middle layer of the pipe can be replaced either partly or entirely with other flexible and soft structures, e.g. by flexible support ribs 12 as shown in FIG. 4. The ribs have the shape of an angular S, and they are flexible in the radial direction of the pipe. The support ribs are preferably of thin plastic, and they can be parallel either with the longitudinal axis of the pipe or with the radius of the pipe, as shown in FIG. 5. The spaces between the support ribs may be empty or filled with foam.

The plastic pipe of the invention is manufactured as follows. Plastic raw material is supplied to an extruder 4 comprising a screw 5 for the middle layer 3, and one or two screws (not shown) for the inner and outer pipe 1 and 2. The screw 5 conveys the plastic material to the right in the figure as far as the nozzle 6, from which the plastic is supplied to a calibration unit, area C outside the pipe and 7 inside the pipe, (FIG. 3), in which the pipe is cooled. As the plastic moves along the screw towards the nozzle, it is plasticized in zone A. The inner pipe can be co-extruded in situ, or especially in the case of two or more inner pipes, they can be extruded first and then passed through an off-set die head where the foam layer and the outer pipe are attached to the inner pipes.

According to the invention, pressurized gas, such as nitrogen or carbon dioxide, is supplied to the plasticized thermoplastic through the cylinder 8 via the passage 9, or by other means through the cylinder. The gas will be absorbed under high pressure in the plastic. The bubble size is minimized in the mixing zone B. In the empodiment illustrated, the mixing zone is formed in the screw by means of finer pitch but in practice conventional mixing screw geometries well known in the art can also be used. Most preferably the plasticizing screw is coaxially mounted inside the conical screw for the outside layer as set forth in our co-pending patent application FI 961822.

The foaming of the plastic material can be enhanced by adding about 1% of a chemical foaming agent, such as azodicarbonamide, thereto. To the plastic material forming the inner and outer pipe and possibly even the middle layer, it is also possible to add staple fibres which can be arranged to be placed in an angular position deviating from the axial direction of the pipe. As an alternative to the use of staple fibres or in addition to it, the plastic of the inner and/or outer pipe can be oriented by means of an extruder in which the mandrel forming the inner surface of the pipe and/or the nozzle forming the outer surface rotate round the centre axis of the apparatus.

Figure 3:
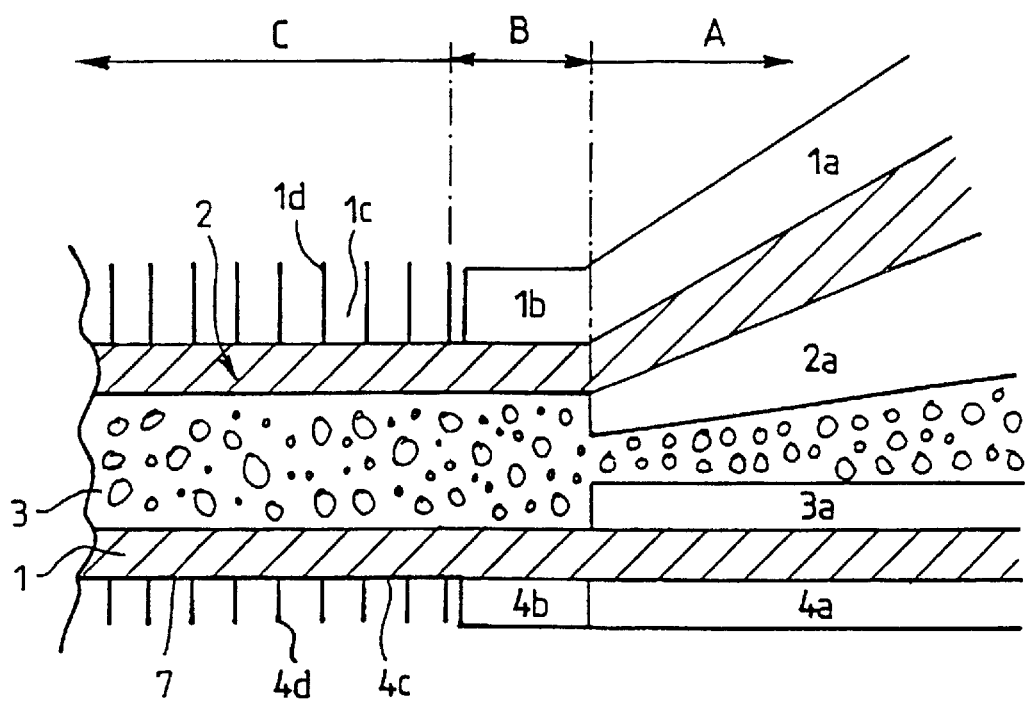

FIG. 3 shows a typical three-layer tool, a nozzle and a calibration system. Reference numeral 1a indicates the outer surface of the tool, which defines the mass flow to the outer pipe of the multilayer pipe. The part defining the outer surface of the middle layer is indicated by 2a, and the bushing separating the middle layer and the inner pipe is indicated by 3a. Reference numeral 4a denotes the tool inner surface, which defines the inner surface of the inner pipe. Section (A) represents the parts belonging to the tool (hot), section (B) represents the parts belonging to the nozzle (hot), and section (C) represents the parts belonging to the calibration (hot or cooled). Sections (C) and (B) may also be attached to each other if a spacing plate of an insulating material is mounted between them in order to prevent excessive heat flux from section (B) to section (C).

The nozzle or die set comprises only a nozzle sleeve 1b, which may be rotatably connected to the tool, and a mandrel 4b, which may also be rotatably connected to the tool. The best quality of the inner pipe is achieved when the mandrel 4b is equipped with water cooling channels (not shown). Alternatively, the body of the entire tool may rotate for orienting the fibres, as disclosed in patent PCT/US90/03394.

The calibration unit comprises an outer calibrator 1c provided with a number of slots 1d for creating a vacuum. The inner calibrator 4c comprises corresponding slots 4d. The figure also shows the extruded outer pipe 2, soft (foam) layer 3 and inner pipe 1. In the calibration unit, the pipe slides along a mandrel 4a and 4b located inside it and a cylinder 1c located outside it, and the foam in the middle layer adapts to the space available. The pressure caused by the foam presses the inner and outer pipe against the mandrel and the cylinder, keeping them thus in contact with each other. This effect can be enhanced by generating underpressure in the above-mentioned parts of the device.

The centering of the inner pipe in co-extruded multilayer pipes having low density foam around the inner pipe is usually carried out by using specific centering pieces.

According to the present invention, the centering of the pipe can be carried out easily by tensioning the pipe element between a haul-off or the extruder head and another haul-off so far that the foam in the middle layer has cooled enough so that it is able to transfer the shear strength from the outer layer to the inner layer for centering the inner pipe.

In the above, the invention has been described by means of only a few preferred embodiments. It will be obvious to one skilled in the art that the details of the invention can be modified within the scope of the appended claims.

What is claimed is:

1. A co-extruded multilayer plastic pipe comprising:
   (a) at least one plastic inner pipe;
   (b) a middle layer comprising a plastic material surrounding and in direct contact with said plastic inner pipe, said plastic material being softer than the plastic inner pipe and having a ring stiffness that is lower than a ring stiffness of the inner pipe; and
   (c) an outer plastic pipe surrounding and in direct contact with said middle layer, said plastic material of the middle layer being sufficiently compressible to allow the middle layer to be deformed by at least 1.5% without deformation of the inner pipe.

2. A multilayer plastic pipe according to claim 1, wherein the outer pipe has a ring stiffness that is lower than the ring stiffness of the inner pipe.

3. A multilayer plastic pipe according to claim 2, wherein the ring stiffness of the inner pipe is at least twice as high as the ring stiffness of the middle layer or the outer pipe.

4. A multilayer plastic pipe according to claim 3, wherein the multilayer pipe has a total ring stiffness of greater than 8 kN/m² and the ring stiffness of the inner pipe is below 6 kN/m².

5. A multilayer plastic pipe according to claim 1, wherein the outer pipe has a ring stiffness that is higher than the ring stiffness of the inner pipe or middle layer.

6. A multilayer plastic pipe according to claim 1, wherein said plastic material comprises a resin, said resin being present in the multilayer plastic pipe in a weight percentage of up to 55% of the multilayer plastic pipe.

7. A multilayer plastic pipe according to claim 1, wherein the inner and outer pipes together have a mass that is at least 45% of a total mass of the multilayer plastic pipe.

8. A multilayer plastic pipe according to claim 7, wherein the mass of the inner and outer pipes is 60–85% of the total mass of the multilayer plastic pipe.

9. A multilayer plastic pipe according to claim 1, wherein the multilayer plastic pipe comprises one inner pipe.

10. A multilayer plastic pipe according to claim 1, wherein the plastic material of the middle layer is selected such that an adhesive force between the middle layer and the inner pipe and an adhesive force between the middle layer and the outer pipe is lower than a breaking energy of the inner pipe.

11. A multilayer plastic pipe according to claim 1, wherein the outer pipe, the inner pipe or both comprise at least two plastic layers said two plastic layers being constructed such that an adhesive force between the at least two layers is lower than a force required to break one of the at least two layers.

12. A multilayer plastic pipe according to claim 1, wherein the plastic material of the inner layer comprises a resin having an elasticity modulus that is lower than an elasticity modulus of the inner pipe and is at most 500 MPA.

13. A multilayer plastic pipe according to claim 12, wherein the elasticity modulus of the middle layer is up to 25% of the elasticity modulus of the inner pipe.

14. A multilayer plastic pipe according to claim 13, wherein the elasticity modulus of the middle layer is less than 10% of the elasticity modulus of the inner pipe.

15. A multilayer plastic pipe according to claim 1, wherein the inner pipe is made of an elastomer having an elasticity modulus of up to 500 MPa.

16. A multilayer plastic pipe according to claim 1, wherein the inner layer has a compressive modulus that is at least twice that of the outer pipe and middle layer measured together.

17. A multilayer plastic pipe according to claim 1, wherein the inner pipe comprises crosslinked polyethylene, the middle layer comprises foamed plastic and the outer pipe comprises a 0.2–0.6 mm thick metal culvert with a plastic skin.

18. A multilayer plastic pipe according to claim 1, wherein the inner pipe comprises crosslinked polyethylene, the middle layer comprises foamed plastic and the outer pipe comprises Mica filled polyolefin.

19. A multilayer plastic pipe according to claim 1, wherein the middle layer comprises foamed plastic having a density of between 50–500 kg/m³.

20. A multilayer plastic pipe according to claim 19, wherein the density of the foamed plastic is between 100–300 kg/m³.

21. A multilayer plastic pipe according to claim 1, wherein the middle layer comprises foamed plastic having a degree of foaming of between 50–95%.

22. A multilayer plastic pipe according to claim 21, wherein the foaming degree is between 70–85%.

23. A multilayer plastic pipe according to claim 1, wherein the multilayer pipe has an outer diameter and an inner diameter, and each of the outer and inner pipes has a thickness, the ratio of the outer diameter to the thickness of the outer pipe being up to 210, the ratio of the inner diameter to the thickness of the inner pipe being up to 200.

24. A multilayer plastic pipe according to claim 1, wherein the outer pipe, the inner pipe or both comprise staple fibers oriented so as to deviate from an axial direction of the multilayer pipe.

25. A multilayer plastic pipe according to claim 1, wherein each of the inner and outer pipes comprise MDPE or HDPE and the middle layer comprises LDPE optionally reinforced with staple fibers or an additive.

26. A multilayer plastic pipe according to claim 25, wherein the additive is a mineral which is present in the middle layer.

27. A multilayer plastic pipe according to claim 1, wherein the middle layer comprises a plurality of flexible support ribs spaced from one another with spaces therebetween, said middle layer optionally comprising foam in the spaces.

28. A method comprising
 (a) providing a plurality of multilayer plastic pipes each according to claim 1;
 (b) disposing said plurality of multilayer plastic pipes in ground for carrying off drainage or sewage from the ground; and
 (c) carrying off drainage or sewage from the ground in said plurality of multilayer plastic pipes.

* * * * *